United States Patent
Blanchet

(10) Patent No.: US 10,998,571 B2
(45) Date of Patent: May 4, 2021

(54) HIGH-VOLTAGE FUEL-CELL STACK

(71) Applicant: Nuvera Fuel Cells, LLC, Billerica, MA (US)

(72) Inventor: Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 12 days.

(21) Appl. No.: 16/276,814

(22) Filed: Feb. 15, 2019

(65) Prior Publication Data
US 2019/0260062 A1 Aug. 22, 2019

Related U.S. Application Data

(60) Provisional application No. 62/632,937, filed on Feb. 20, 2018.

(51) Int. Cl.
| | |
|---|---|
| *H01M 8/04* | (2016.01) |
| *H01M 8/2484* | (2016.01) |
| *H01M 4/86* | (2006.01) |
| *H01M 8/0247* | (2016.01) |
| *H01M 8/1004* | (2016.01) |

(Continued)

(52) U.S. Cl.
CPC ............ *H01M 8/2484* (2016.02); *C25B 1/04* (2013.01); *C25B 9/63* (2021.01); *C25B 9/70* (2021.01); *C25B 9/73* (2021.01); *H01M 4/86* (2013.01); *H01M 8/0202* (2013.01); *H01M 8/0247* (2013.01); *H01M 8/1004* (2013.01); *H01M 8/242* (2013.01); *H01M 8/249* (2013.01); *H01M 8/2475* (2013.01); *H01M 2008/1095* (2013.01)

(58) Field of Classification Search
CPC ....... H01M 8/1004; H01M 2008/1095; H01M 8/2484; H01M 8/0202
See application file for complete search history.

(56) References Cited

U.S. PATENT DOCUMENTS

| | | | | |
|---|---|---|---|---|
| 5,945,232 | A * | 8/1999 | Ernst .................. | H01M 8/0223 429/413 |
| 2003/0039876 | A1 * | 2/2003 | Knights .............. | H01M 8/0213 429/479 |

(Continued)

FOREIGN PATENT DOCUMENTS

| | | |
|---|---|---|
| CN | 101165957 A | 4/2008 |
| JP | 2007194156 A | 8/2007 |

OTHER PUBLICATIONS

Notification of transmittal of the International Search Report and the Written Opinion of the International Searching Authority, issued in PCT International Application No. PCT/US2019/018146 dated May 23, 2019, 16 pages.

*Primary Examiner* — Olatunji A Godo
(74) *Attorney, Agent, or Firm* — Finnegan, Henderson, Farabow, Garrett & Dunner LLP

(57) ABSTRACT

The electrochemical cell stack assembly has electrochemical cell sub-stacks. A first and second electrochemical cell sub-stack are connected electrically in series and fluidly in parallel. The first and second electrochemical cell sub-stacks have electrochemical cells. The electrochemical cells have a membrane electrode assembly with an cathode catalyst layer, an anode catalyst layer, and a polymer membrane therebetween. The electrochemical cells have an anode plate and a cathode plate with the membrane electrode assembly interposed therebetween, a cathode flow field, and the anode plate.

22 Claims, 7 Drawing Sheets

(51) Int. Cl.
   *H01M 8/242*   (2016.01)
   *H01M 8/2475*  (2016.01)
   *H01M 8/0202*  (2016.01)
   *H01M 8/249*   (2016.01)
   *C25B 1/04*    (2021.01)
   *C25B 9/63*    (2021.01)
   *C25B 9/70*    (2021.01)
   *C25B 9/73*    (2021.01)
   *H01M 8/1018*  (2016.01)

(56) References Cited

U.S. PATENT DOCUMENTS

| | | |
|---|---|---|
| 2003/0235725 A1 | 12/2003 | Haltiner et al. |
| 2009/0035631 A1* | 2/2009 | Zagaja ............ H01M 8/0232 429/514 |
| 2017/0331139 A1 | 11/2017 | Kerr et al. |

* cited by examiner

HIGH-VOLTAGE FUEL-CELL STACK

This application claims the benefit of U.S. Provisional Application No. 62/632,937, filed Feb. 20, 2018, which is incorporated by reference in its entirety.

The present disclosure is directed towards a fuel-cell stack and, more particularly, towards a high-voltage fuel-cell stack.

Electrochemical cells, usually classified as fuel cells or electrolysis cells, are devices used for generating current from chemical reactions or for inducing a chemical reaction using a flow of current. For example, a fuel cell may convert the chemical energy of fuel (e.g., hydrogen, natural gas, methanol, gasoline, etc.) and an oxidant (air or oxygen) into electricity and waste products of heat and water. A basic fuel cell may comprise a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons then flow through the circuit to the cathode and generate electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell may function as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management. Successful commercialization of hydrogen as an energy carrier and the long-term sustainability of a "hydrogen economy" may depend largely on the efficiency and cost-effectiveness of fuel cells, electrolysis cells, and other hydrogen manipulation/management systems.

In operation, a single fuel cell can generally generate about 1 volt under no load (i.e., when not supplying current to an electrical load) or about 0.75 volts under load (i.e., when supplying current to an electrical load). Each fuel cell may include a cathode, an electrolyte membrane, and an anode. A cathode/membrane/anode assembly constitutes a "membrane electrode assembly," or "MEA," which is typically supported on both sides by bipolar plates. One square centimeter of active area of the MEA may generally sustain 1 ampere of current. To generate the desired amount of electrical power, individual fuel cells may be combined to form a fuel-cell stack, wherein fuel cells are stacked together sequentially. The amount of power generated may be generally proportional to the number of fuel cells stacked and the active area of the MEAs used. The number of fuel cells stacked may be generally proportional to the voltage generated by the fuel-cell stack. The active area of the MEAs used may be generally proportional to the current the fuel-cell stack may sustain. Reactant gases or fuel (e.g., hydrogen) and oxidant (e.g., air or oxygen) are supplied to the electrodes of the MEA through flow fields. In addition to providing mechanical support, the bipolar plates (also known as flow field plates or separator plates) physically separate individual cells in a stack while electrically connecting them. A typically fuel-cell stack includes manifolds and inlet ports for directing the fuel and oxidant to the anode and cathode flow fields, respectively. A fuel-cell stack also includes exhaust manifolds and outlet ports for expelling the excess fuel and oxidant. A fuel-cell stack may also include manifolds for circulating coolant fluid to help expel heat generated by the fuel-cell stack.

In some fuel-cell applications, it may be desirable to deliver high amounts of power to an electrical load. This may be achieved by delivering power at a high electric potential, a high electrical current, or both. In some applications, it may be desirable to deliver high power at a high potential but with a low current. Doing so may decrease the size of electrical conductors carrying current and thereby decrease the size of the mechanism or device using the fuel-cell stack. Therefore, it may be desirable to stack fuel cells to increase the potential generated by the fuel-cell stack. Stacking fuel cells, however, may increase the length of manifolds carrying fuel, oxidant, and coolant. Increasing the length of the manifolds may increase the velocity of the fluids travelling therein and result in uneven utilization of fluids by the fuel cells. Uneven utilization of fluids by the fuel cells may result in uneven use of MEA active areas and decreased efficiency. Increasing the size of the manifolds to decrease fluid velocity may result in a larger fuel-cell stack. Further, a fuel-cell stack with one dimension substantially longer than the others may be undesirable because there may be few existing housings currently available to accommodate such fuel-cell stacks. Therefore, there is a continuing challenge to improve the design of high-voltage fuel-cell stacks.

The disclosed high-voltage fuel-cell stack designs are directed to overcoming one or more problems set forth above and/or other problems with existing technologies.

In one aspect, the present disclosure is directed to an electrochemical cell stack assembly. The electrochemical cell stack assembly may comprise a plurality of electrochemical cell sub-stacks. A first electrochemical cell sub-stack and a second electrochemical cell sub-stack may be connected electrically in series and connected fluidly in parallel. The first electrochemical cell sub-stack and the second electrochemical cell sub-stack may comprise a plurality of electrochemical cells. The electrochemical cells may comprise a membrane electrode assembly, which may comprise a cathode catalyst layer, an anode catalyst layer, and a polymer membrane interposed between the cathode catalyst layer and the anode catalyst layer. The first electrochemical cell sub-stack and the second electrochemical cell sub-stack may comprise an anode plate and a cathode plate with the membrane electrode assembly interposed therebetween. The first electrochemical cell sub-stack and the second electrochemical cell sub-stack may comprise a cathode flow field positioned between the cathode plate and the cathode catalyst layer. Electrical current may pass from the first electrochemical cell sub-stack to the second electrochemical cell sub-stack. A first electrically conductive structure may be disposed at a first end of the first electrochemical cell sub-stack and a second electrically conductive structure may be disposed at a first end of the second electrochemical cell sub-stack. The first electrically conductive structure may be electrically coupled to the second electrically conductive structure. An electrically conductive structure may be disposed at first ends of the first and second electrochemical cell sub-stacks. An electrically conductive structure may be disposed at a first end of at least one of first or second electrochemical cell sub-stacks. The electrically conductive structure may be electrically coupled to a frame of a mechanism housing the electrochemical cell stack assembly. The electrically conductive structure may be at a common electric potential with the frame of the mechanism housing the electrochemical cell stack assembly. A first current collector may be disposed at a first end of the first electrochemical cell sub-stack and a second current collector may be disposed at a first end of the second electrochemical cell sub-stack. The first current collector may be at a higher electric potential than a frame of a mechanism housing the electrochemical cell stack assembly. The second current collector may be at a lower electric potential than the frame of the mechanism housing the electrochemical cell stack assembly. The first current collector may be at an electric potential from about −1000 volts to about +1000 volts and the second collector may be at an electric potential from about −1000 volts to about +1000 volts. Electrons may flow (i) in a first direction from the first current collector to a second end of the first electrochemical cell sub-stack and (ii) in a second direction from a second end of the second electrochemical cell sub-stack to the second current collector. The first direction may be opposite to the second direction. An electrical insulator may be disposed between the first and second electrochemical cell sub-stacks. A supply of at least one of fuel, oxidant, or coolant may be split between the first and second electrochemical cell sub-stacks fluidly connected in parallel. A manifold distribution plate may be connected to first ends of the first and second electrochemical cell sub-stacks. The manifold distribution plate may fluidly split a supply of at least one of fuel, oxidant, or coolant to the first and second electrochemical cell sub-stacks. The cathode flow field may comprise a porous structure. The plurality of electrochemical cell sub-stacks may generate a current from about 0 amperes to about 1000 amperes.

In another aspect, the present disclosure is directed to a method of arranging an electrochemical cell stack assembly. The method may comprise connecting electrically a first electrochemical cell sub-stack and a second electrochemical cell sub-stack in series. The method may further comprise connecting fluidly the first electrochemical cell sub-stack and the second electrochemical cell sub-stack in parallel. The first electrochemical cell sub-stack and the second electrochemical cell sub-stack may comprise a plurality of electrochemical cells. Electrochemical cells may comprise a membrane electrode assembly comprising a cathode catalyst layer, an anode catalyst layer, and a polymer membrane interposed between the cathode catalyst layer and the anode catalyst layer. The electrochemical cells may comprise an anode plate and a cathode plate with the membrane electrode assembly interposed therebetween, a cathode flow field, and anode flow field. The method may further comprise disposing a first electrically conductive structure at a first end of the first electrochemical cell sub-stack, disposing a second electrically conductive structure at a first end of the second electrochemical cell sub-stack, and electrically coupling the first electrically conductive structure to the second electrically conductive structure. The method may further comprise disposing an electrically conductive structure at first ends of the first and second electrochemical cell sub-stacks. The method may further comprise disposing an electrically conductive structure at a first end of at least one of first or second electrochemical cell sub-stacks. The electrically conductive structure may be electrically coupled to a frame of a mechanism housing the electrochemical cell stack assembly. The electrically conductive structure may be at a common electric potential with the frame of the mechanism housing the electrochemical cell stack assembly. The method may further comprise disposing a first current collector at a first end of the first electrochemical cell sub-stack and disposing a second current collector at a first end of the second electrochemical cell sub-stack. The first current collector may be at a higher electric potential than a frame of a mechanism housing the electrochemical cell stack assembly. The second current collector may be at a lower electric potential than the frame of the mechanism housing the electrochemical cell stack assembly. The method may further comprise disposing an electrical insulator between the first and second electrochemical cell sub-stacks.

It is to be understood that both the foregoing general description and the following detailed description are exemplary and explanatory only and are not restrictive of the disclosure, as claimed.

The accompanying drawings, which are incorporated herein and constitute a part of this specification, illustrate embodiments of the present disclosure and, together with the description, serve to explain the principles of the disclosure.

Reference will now be made in detail to exemplary embodiments of the present disclosure, examples of which are illustrated in the accompanying drawings. Wherever possible, the same reference numbers will be used throughout the drawings to refer to the same or like parts. Although described in relation to an electrochemical fuel-cell stack for generating electricity, it is understood that the devices and methods of the present disclosure may be employed with various types of fuel cells or electrochemical cells, including, but not limited to, electrolysis cells, hydrogen purifiers, hydrogen expanders, and hydrogen pumps.

Figure 1:
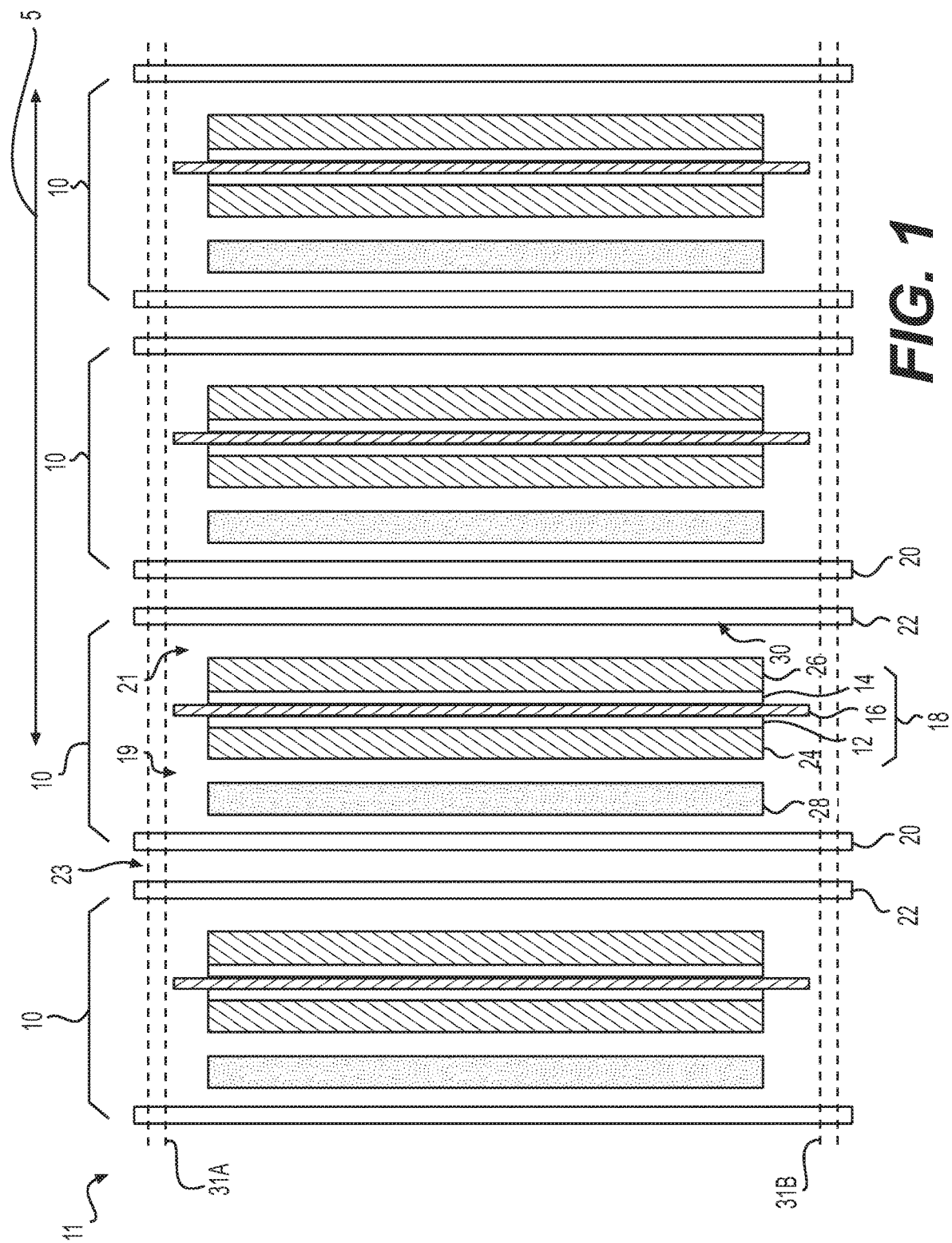
FIG. 1 is a side schematic view of a plurality of electrochemical cells (e.g., fuel cells) stacked together, according to an exemplary embodiment.

FIG. 1 is a side schematic side view of a plurality of electrochemical cells, for example, fuel cells 10 stacked together along a longitudinal axis 5 to form at least a portion of a fuel-cell stack 11, according to an exemplary embodiment. A fuel cell 10 can comprise a cathode catalyst layer 12, which may also be referred to herein as a cathode, an anode catalyst layer 14, which may also be referred to herein an anode, and a proton exchange membrane (PEM) 16 disposed between cathode catalyst layer 12 and anode catalyst layer 14, which collectively may be referred to as a membrane electrode assembly (MEA) 18. PEM 16 can comprise a pure polymer membrane or composite membrane with other material. For example, silica, heteropolyacids, layered metal phosphates, phosphates, and zirconium phosphates can be embedded in a polymer matrix. PEM 16 can be permeable to protons while not conducting electrons. Cathode catalyst layer 12 and anode catalyst layer 14 can comprise porous carbon electrodes containing a catalyst. The catalyst material, for example platinum, can increase the reaction of oxygen and fuel. In some embodiments, cathode catalyst layer 12 and anode catalyst layer 14 may have an average pore size of about 1 µm.

Fuel cell 10 can comprise two bipolar plates, for example, a cathode plate 20 and an anode plate 22. Cathode plate 20 may be positioned adjacent cathode catalyst layer 12 and anode plate 22 may be positioned adjacent anode catalyst layer 14. MEA 18 can be interposed and enclosed between cathode plate 20 and anode plate 22. A cathode compartment 19 may be formed between MEA 18 and cathode plate 20 and an anode compartment 21 may be formed between MEA 18 and anode plate 22. Cathode plate 20 and anode plate 22 can act as current collectors, provide access flow passages for fuel and oxidant to the respective electrode surfaces (e.g., anode catalyst layer 14 and cathode catalyst layer 12), and provide flow passages for the removal of water formed during operation of fuel cell 10. A different conductive structure or structures may function as current collectors instead of or in addition to cathode plate 20 and anode plate 22. Cathode plate 20 and anode plate 22 can also define flow passages for coolant fluid (e.g., water, glycol, or water glycol mixture). For example, between cathode plate 20 and anode plate 22 of adjacent fuel cells 10 a coolant compartment 23 may be formed, which is configured to circulate coolant fluid between adjacent fuel cells 10. Heat generated by fuel cells 10 can be transferred to the coolant fluid and be carried away by the circulation of the coolant fluid. Cathode plate 20 and anode plate 22 may be made from, for example, aluminum, steel, stainless steel, titanium, copper, a Ni—Cr alloy, graphite, or any other suitable electrically conductive material.

In some embodiments, for example, as illustrated in FIG. 1, fuel cell 10 may also include electrically-conductive gas diffusion layers (e.g., cathode gas diffusion layer 24 and anode gas diffusion layer 26) within fuel cell 10 on each side of MEA 18. Gas diffusion layers 24, 26 may serve as diffusion media enabling the transport of gases and liquids within the cell, provide electrical conduction between cathode plate 20, anode plate 22, and MEA 18, aid in the removal of heat and process water from fuel cell 10, and in some cases, provide mechanical support to PEM 16. Gas diffusion layers 24, 26 can comprise a woven or non-woven carbon cloth with cathode catalyst layer 12 and anode catalyst layer 14 coated on the sides facing PEM 16. In some embodiments, cathode catalyst layer 12 and anode catalyst layer 14 may be coated onto either the adjacent GDL 24, 26 or PEM 16. In some embodiments, gas diffusion layers 24, 26 may have an average pore size of about 10 µm.

Fuel cell 10 may further include flow fields positioned on each side of MEA 18. The flow fields may be configured to enable fuel and oxidant on each side of MEA 18 to flow through the fields and reach MEA 18. These flow fields may facilitate even distribution of fuel and oxidant to cathode and anode catalyst layers 12, 14. Even distribution of fuel and oxidant to the catalyst layers 12, 14 may increase the performance of fuel cell 10. In some embodiments, fuel cell 10 may include a cathode flow field 28 that comprises a porous structure positioned between cathode plate 20 and GDL 24. In some embodiments, rather than a separate porous structure, fuel cell 10 may comprise a cathode flow field formed in cathode plate 20. In some embodiments, fuel cell 10 may include an anode flow field 30, which may be formed by anode plate 22, as described further herein with respect to FIG. 2. In some embodiments, fuel cell 10 may include an anode flow field that comprises a porous structure positioned between anode plate 22 and GDL 26. It is contemplated that in various embodiments of fuel cell 10, any combination of the above described flow fields may be utilized. GDL 24 may provide mechanical protection of cathode catalyst layer 12 from cathode flow field 28.

It is to be understood that although only one fuel cell 10 in FIG. 1 includes reference numerals for cathode catalyst layer 12, anode catalyst layer 14, proton exchange membrane 16, membrane electrode assembly (MEA) 18, cathode compartment 19, cathode plate 20, anode compartment 21, anode plate 22, coolant compartment 23, gas diffusion layer 24, gas diffusion layer 26, cathode flow field 28, and anode flow field 30, the other fuel cells 10 of stack 11 may include the same elements.

Fuel-cell stack 11 may also include a plurality of fluid manifolds 31a, 31b extending along longitudinal axis 5 defined by the series of stacked cathode plates 20 and anode plates 22 of fuel cells 10. Fluid manifolds 31a, 31b may be configured for feeding fuel (e.g., hydrogen) and oxidant (e.g., oxygen) to MEA 18 of each fuel cell 10 and discharging reactant products (e.g., unreacted fuel, unreacted oxidant, and water) from MEA 18 of each fuel cell. Fluid manifolds 31A, 31B may also be configured for feeding and discharging coolant fluid. The direction of flow through fluid manifolds 31a, 31b may vary. For example, in some embodiments the flow through the manifolds and compartments may be concurrent while in other embodiments, one or more of the flow paths may be countercurrent. For example, in some embodiments, the flow of fuel through anode feed manifolds 32a, 32b (discussed below with respect to FIG. 3) may be countercurrent to the flow of oxidant through cathode feed manifolds 44a, 44b (discussed below with respect to FIG. 3). Fluid manifolds 31a, 31b may fluidly connect to MEA 18 via passages and ports. Specific manifolds, passages, and ports may be identified herein as "feed," "discharge," "inlet," or "outlet," but it is to be understood these designations may be determined based on the direction of flow and the direction of flow may be switched. Changing the direction of flow may change these designations.

Figure 2:
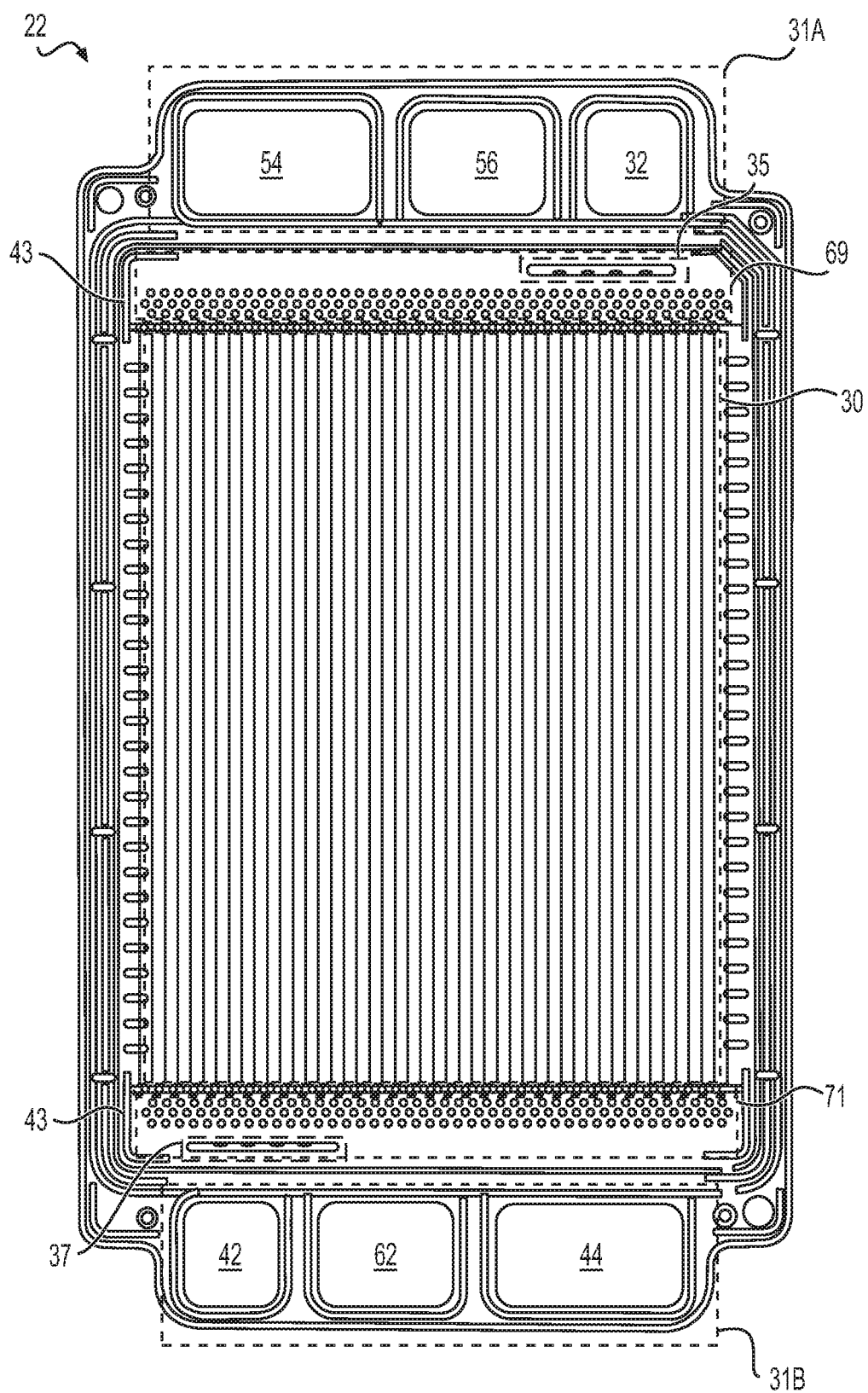
FIG. 2 is a front view of an anode plate of FIG. 1, according to an exemplary embodiment.

FIG. 2 is a front view of anode plate 22, according to exemplary embodiment. The side visible in FIG. 2 is the side configured to face the anode side of MEA 18 (i.e., anode catalyst layer 14 and gas diffusion layer 26) and define one side of anode compartment 21 (see, e.g., FIG. 1). Anode plate 22 may include several sections. These sections may include for example, first manifold section 31A and second manifold section 31B; distribution channel sections such as a first anode distribution channel 69 and a second anode distribution channel 71; and anode flow field 30. As shown in FIG. 2, anode plate 22 may include anode feed manifold 32, cathode discharge manifold 54, and coolant feed manifold 56 in first manifold section 31A while second manifold section 31B may include anode discharge manifold 42, cathode feed manifold 44, and coolant discharge manifold 62. It is to be understood that the designation of inlet and outlet for each manifold may be switched, for example, by switching the respective flow direction of the fuel, the oxidant, or the coolant fluid flow through fuel cells 10.

As shown in FIG. 2, disposed between first and second manifold sections 31A, 31B and anode flow field 30 are first and second anode distribution channels 69, 71. First anode distribution channel 69 may be configured to distribute fuel supplied from anode feed manifold 32 via anode inlet port 35 to anode flow field 30. Second anode distribution channel 71 may be configured to collect fuel (e.g., unreacted fuel) from anode flow field 30 and direct fuel through anode outlet port 37 to anode discharge manifold 42. First anode distribution channel 69 and second anode distribution channel 71 may be sandwich between and defined by MEA 18 and anode plate 22. Perimeters of first anode distribution channel 69 and second anode distribution channel 71 may be sealed by surface gaskets 43, as illustrated in FIG. 2. In some embodiments, the width of first anode distribution channel 69 and the width of second anode distribution channel 71 may generally equal the width of anode flow field 30.

Figure 3:
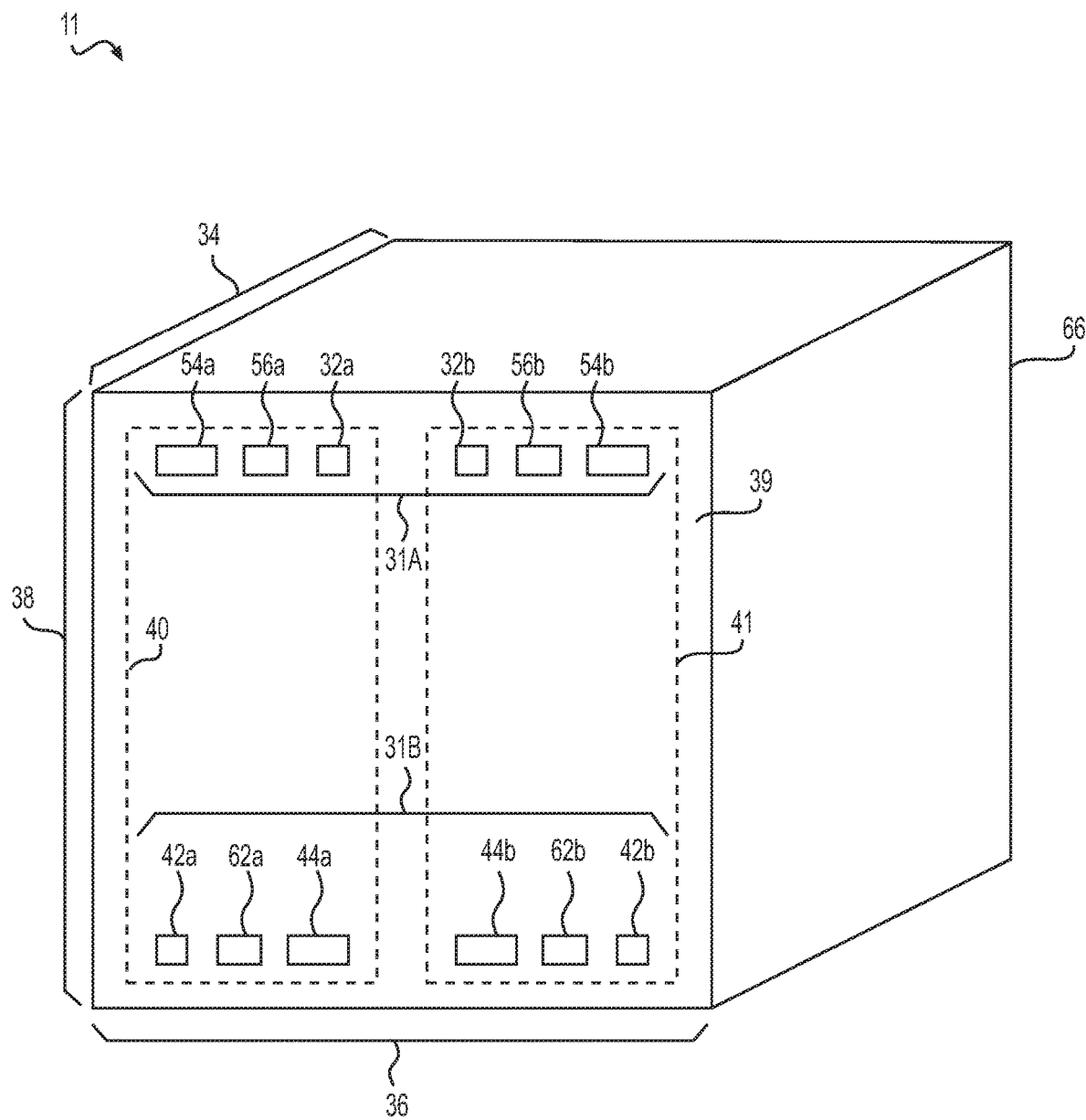
FIG. 3 is a front perspective diagram view of a fuel-cell stack, according to an exemplary embodiment.

FIG. 3 shows a diagram of a fuel-cell stack 11 of length 34, width 36, and height 38. Fuel-cell stack 11 may comprise stacked cells, the areas of which are substantially similar to the area of front end 39 of fuel-cell stack 11. Fuel-cell stack 11 may comprise cells that may be conceptually divided into two, with halves of each cell comprising first and second sub-stacks 40, 41. Sub-stack 40 may be beside sub-stack 41. A sub-stack, such as sub-stacks 41, may have a set of fluid manifolds. Manifolds 31a in sub-stacks 40, 41 may comprise anode feed manifolds 32a, 32b, respectively; cathode discharge manifolds 54a, 54b, respectively; and coolant feed manifolds 56a, 56b, respectively. Manifolds 31b in sub-stacks 40, 41 may comprise anode discharge manifolds 42a, 42b, respectively; cathode feed manifolds 44a, 44b, respectively; and coolant discharge manifolds 62a, 62b, respectively. It is to be understood, that the designation of inlet and outlet for each manifold may be switched, for example, by switching the respective flow direction of the fuel, the oxidant, or the coolant fluid flow through fuel cells 10.

The cross-sectional area of each manifold can vary. For example, as shown in FIG. 3, cathode feed and discharge manifolds 44a, 44b, 54a, 54b may have larger cross-sectional areas than coolant feed and discharge manifolds 56a, 56b, 62a, 62b. Coolant feed and discharge manifolds 56a, 56b, 62a, 62b may have larger cross-sectional areas than anode feed and discharge manifolds 32a, 32b, 42a, 42b.

The arrangement of the manifolds in sub-stacks 40, 41 may vary. As shown in FIG. 3, the arrangement of the manifolds may be different between manifold sections 31a, 31b. In one illustrative example, as shown in FIG. 3, coolant feed manifold 56a may be positioned between anode feed manifold 32a and cathode discharge manifold 54a, and coolant discharge manifold 62a may be positioned between anode discharge manifold 42a and cathode feed manifold 44a. In some embodiments, cathode discharge manifold 54a may be left of coolant feed manifold 56a and anode feed manifold 32a may be right of coolant feed manifold 56a while cathode feed manifold 44a may be right of coolant discharge manifold 62a and anode discharge manifold 42a may be left of coolant discharge manifold 62a. Swapping the positioning of the anode and cathode manifolds relative to the coolant manifolds between first manifold section 31a and second manifold section 31b may promote a diagonal cross countercurrent flow or "z-flow" rather than a straight-across flow. The diagonal cross countercurrent flow may provide improved uniform distribution of fuel and oxidant across the active area, which may improve fuel-cell performance. The performance may be improved because the diagonal cross countercurrent flow may maximize the active area utilized.

The positioning of the coolant manifolds 56a, 62a in the center of first fluid manifold 31a and second fluid manifold 31b may result in the central region of the coolant compartment receiving the most coolant fluid flow. The central region of the coolant compartment may correspond to the central region of the active area of fuel cell 10. The central region of the active area of fuel cell 10 may experience increased heat generation. In some embodiments, the regions of fuel cells within fuel-cell stack 11 that may generate the most heat may correspond with the regions receiving the most coolant fluid flow.

An electric potential may be generated between front end 39 and back end 66 of fuel-cell stack 11. When fuel-cell stack 11 is under load (e.g., delivering current to an external electrical load), current may flow from a point on fuel-cell stack 11 with a higher potential, through the load, and to a point on fuel-cell stack 11 with a lower potential. For example, current may flow from front end 39, through an external load (not shown), and to back end 66. When this occurs, electrons may flow across fuel cells 10 in a direction from front end 39 to back end 66.

Figure 4:
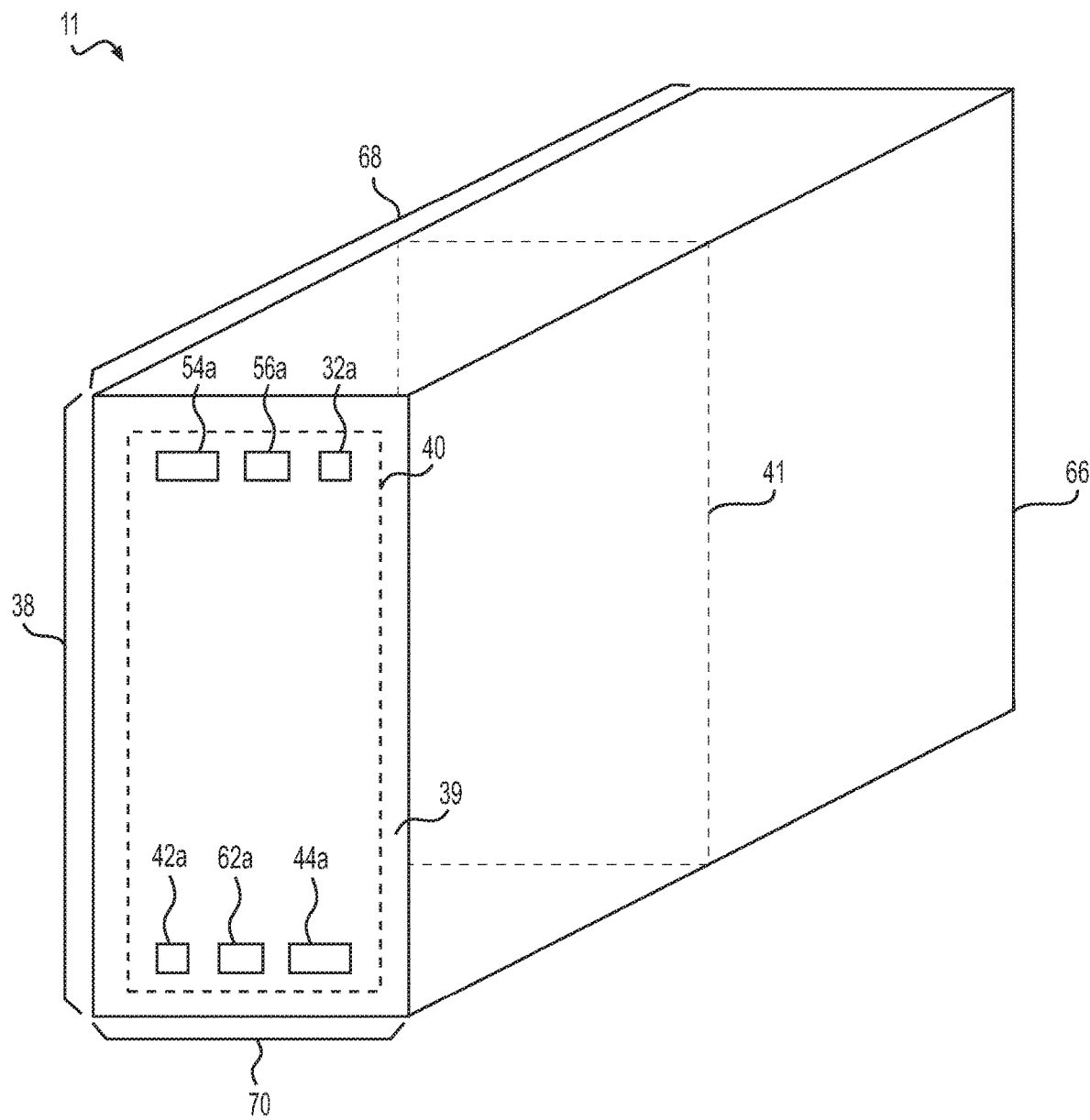
FIG. 4 is a front perspective diagram view of a fuel-cell stack, according to another exemplary embodiment.

Fuel-cell stack 11 may generate power. The amount of power generated may be determined by the electric potential generated across fuel-cell stack 11 and the electrical current passing through fuel-cell stack 11. An alternate configuration of fuel-cell stack 11 may be capable of delivering the same amount of power by generating a higher electric potential and passing a smaller electrical current. For example, FIG. 4 is a diagram of another configuration of fuel-cell stack 11, according to exemplary embodiment. If the cells of fuel-cell stack 11 as illustrated in FIG. 3 are divided in two such that the area of each cell is substantially similar to the area of the front end of each sub-stack 40 (e.g., divided in half), the cells within sub-stack 41 may be positioned behind the cells within sub-stack 40 (i.e., sub-stack 41 may be position behind sub-stack 40). In some embodiments, sub-stack 41 may be positioned in front of sub-stack 40. In either of these arrangements, the electric potential generated may be higher than in the embodiment illustrated in FIG. 3 because there are more cells connected electrically in series. The electrical current passed may be lower than in the embodiment illustrated in FIG. 3 because the active area is limited to the area of cells in sub-stack 40 rather than the areas of cells in both sub-stack 40 and sub-stack 41. In the embodiment illustrated in FIG. 4, the lengths of manifolds 54a, 56a, 32a, 42a, 62a, and 44a may be increased from those of the embodiment illustrated in FIG. 3 to deliver fuel, coolant, and oxidant a greater distance to sub-stack 41. Increasing the lengths of these manifolds may increase the velocity of at least one of fuel, coolant, or oxidant through fuel-cell stack 11. An increased velocity may result in uneven consumption of one or more of these substances. To decrease the velocity and increase the uniformity of consumption of these substances, the size of the manifolds may be increased. Increasing the sizes of the manifolds, however, may increase the overall size of fuel-cell stack 11. Increasing length 34 to accommodate sub-stack 41 may make length 68 substantially larger than height 38 and/or width 70. In some embodiments, it may be preferable for fuel-cell stack 11 to have two or more dimensions similar to one another. For example, in some embodiments, it may be preferable for fuel-cell stack 11 to have length 68 be within one foot of height 38. In some embodiments, it may be preferable for fuel-cell stack 11 to have length 68 be within one foot of width 70. In some embodiments, there may be no preference associated with relationships between dimensions.

Figure 5:
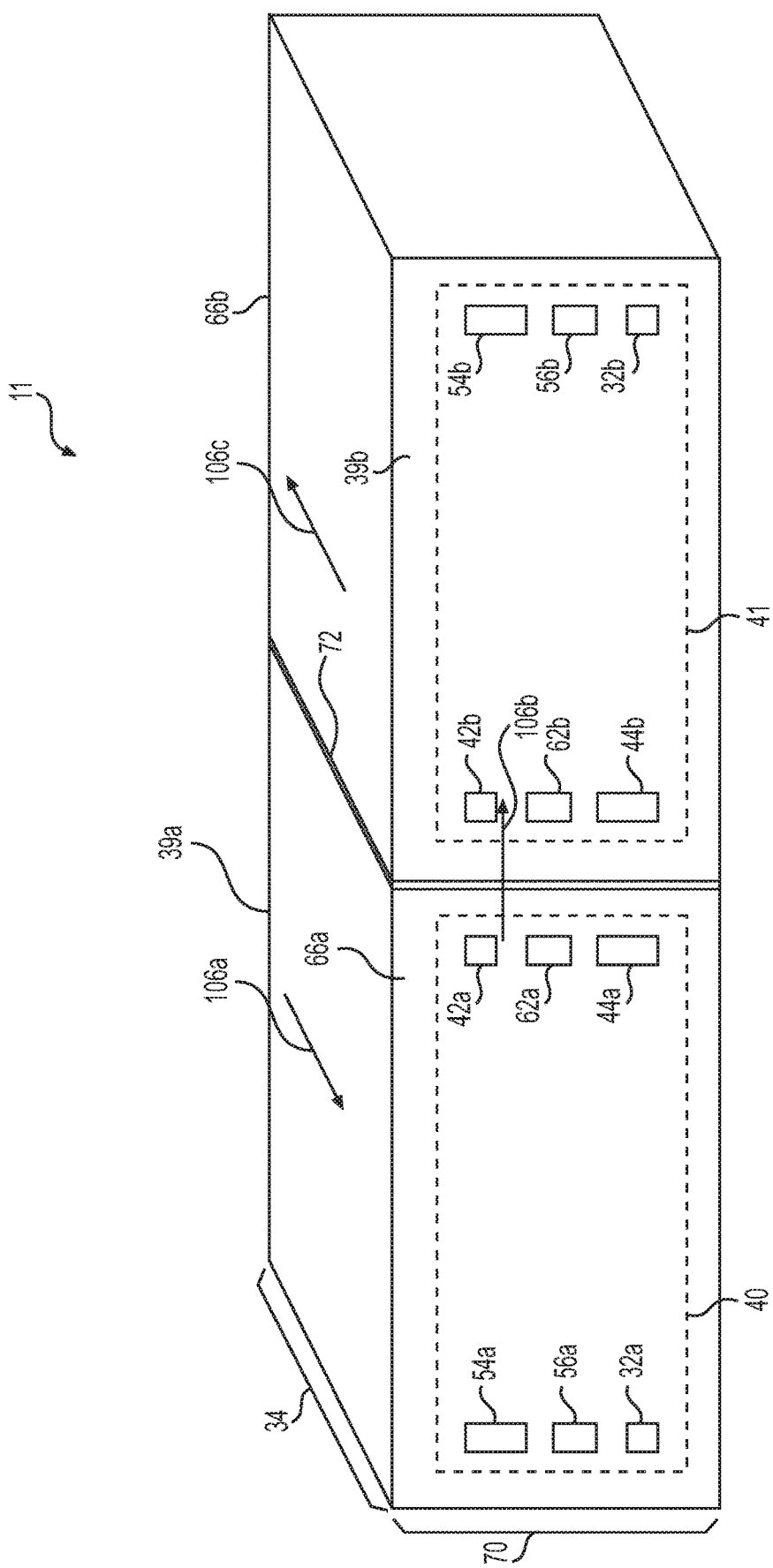
FIG. 5 is a front perspective diagram view of a fuel-cell stack, according to another exemplary embodiment.
Figure 6:
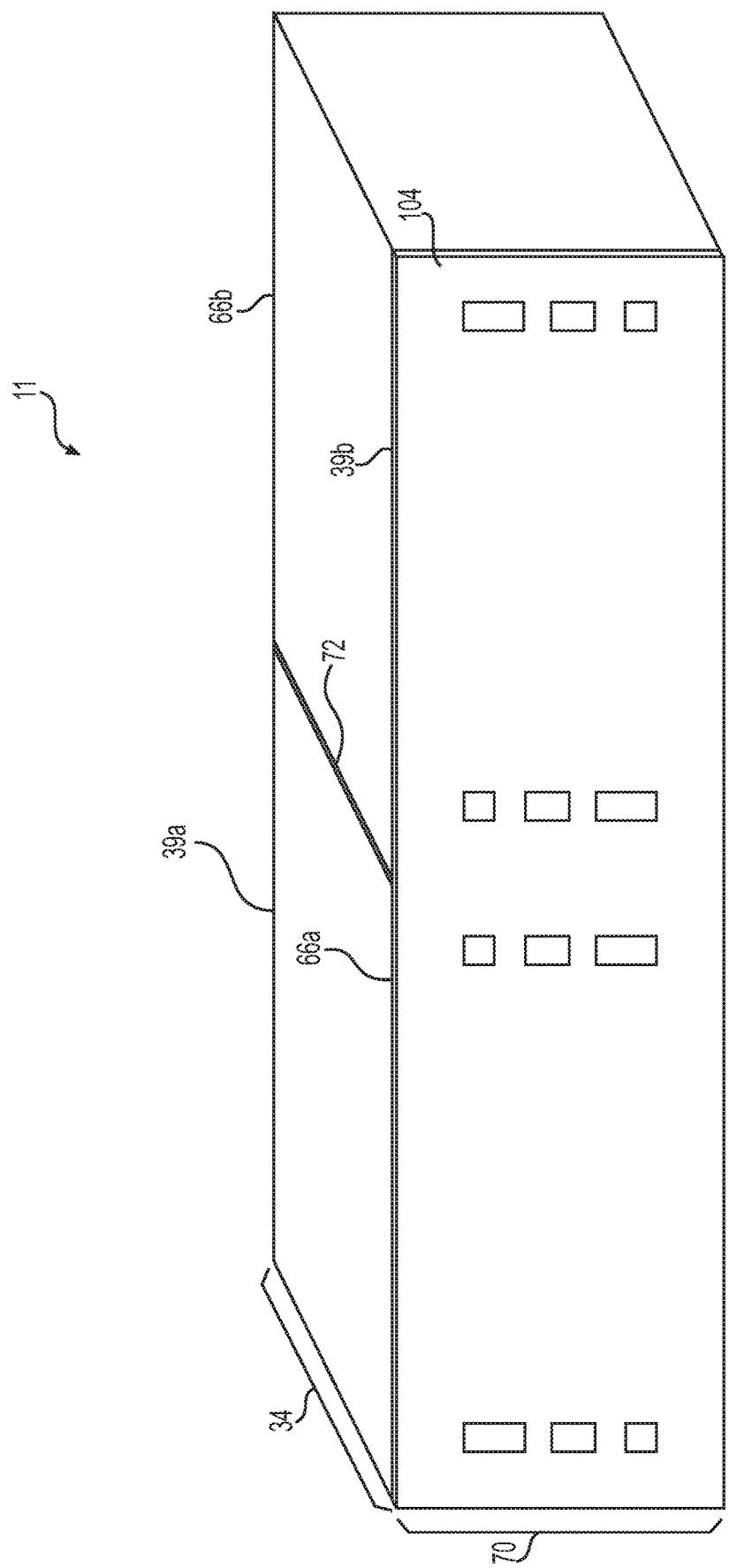
FIG. 6 is a front perspective diagram view of a fuel-cell stack with a conductive plate, according to another exemplary embodiment.

FIG. 5 is a diagram of another configuration of fuel-cell stack 11, according to an exemplary embodiment. Sub-stacks 40, 41 may be arranged beside each other. In some embodiments, front end 39a of sub-stack 40 may be adjacent to back end 66b of sub-stack 41. In this manner, an electric potential may be established between front end 39a of sub-stack 40 and back end 66a of sub-stack 40 and an electric potential may be established between front end 39b of sub-stack 41 and back end 66b of sub-stack 41. In order to establish an electric potential between front end 39a of sub-stack 40 and back end 66b of sub-stack 41, the back end 66a of sub-stack 40 and front end 39b of sub-stack 41 may be electrically coupled. For example, the back end 66a of sub-stack 40 and the front end 39b of sub-stack 41 may be hardwired together. In some embodiments, an electrically conducting material (e.g., a metal plate) may be placed across at least a portion of the back end 66a of sub-stack 40 and at least a portion the front end 39b of sub-stack 41. As illustrated in FIG. 6, a electrically conducting metal plate 104 may be placed across back end 66a of sub-stack 40 and front end 39b of sub-stack 41. With this arrangement, sub-stack 40 and sub stack 41 may be considered to be connected electrically in series. The electric potential at the front end 39a of sub-stack 40 may be at a higher potential than back end 66b of sub-stack 41. In some embodiments, the electric potential at the front end 39a of sub-stack 40 may be from about −1000 volts to about +1000 volts. In some embodiments, the electric potential at the back end 66b of sub-stack 41 may be from about −1000 volts to about +1000 volts. When fuel-cell stack 11 is under an electrical load, current may flow from front end 39a of sub-stack 40 through the electrical load and from the electrical load to back end 66b of sub-stack 41. Electrons may flow across cells in sub-stack 40 in the direction from front end 39a of sub-stack 40 to back end 66a of sub-stack 40. This direction is indicated by arrow 106a. Electrons may cross from back end 66a of sub-stack 40 to front end 39b of sub-stack 41, such as over an electrically conducting material in the direction indicated by arrow 106b. Electrons may flow across cells in sub-stack 41 in the direction from front end 39b of sub-stack 41 to back end 66b of sub-stack 41. This direction is indicated by arrow 106c. Sub-stacks 40, 41 may generate a current from about 0 amperes to about 1000 amperes.

In some embodiments, an electrically insulating material 72 may be disposed between sub-stacks 40, 41. Insulating material 72 may be, for example, a plastic such as polytetrafluoroethylene (PTFE). Insulating material 72 may prevent short-circuits from being established between sub-stacks 40, 41.

In some embodiments, back end 66b of sub-stack 41 may be held at one or more electric potential by, for example, hardwiring or coupling back end 66b of sub-stack 41 to another point that is at the electric potential at which back end 66b of sub-stack 41 is to be held. This electric potential may be, for example, the electric potential of the frame of the mechanism housing fuel-cell stack 11 (e.g., a vehicle chassis). In some embodiments, the points at which sub-stacks 40, 41 are connected to each other may be held at one or more electric potential. This electric potential may be, for example, the electric potential of the frame of the mechanism housing fuel-cell stack 11 (e.g., a vehicle chassis). Making such a connection may force the electric potential at back end 66b of sub-stack 41 below that of the frame of the mechanism housing fuel-cell stack 11. Making such a connection may force the electric potential at front end 39a of sub-stack 40 above that of the frame of the mechanism housing fuel-cell stack 11. Making such a connection instead of connecting back end 66b of sub-stack 41 to the frame may permit some or all locations on fuel-cell stack 11 to be closer to the electric potential of the frame of the mechanism housing fuel-cell stack 11 (e.g., a vehicle chassis). For example, if the electric potential across fuel-cell stack 11 is 560V and the electric potential between front end 39a and back end 66a of sub-stack 40 is the same as the electric potential between front end 39b and back end 66b of sub-stack 41, connecting the points at which sub-stacks 40, 41 are connected to each other to the chassis of a vehicle housing fuel-cell stack 11 may make the greatest difference in potential between a point on fuel-cell stack 11 and the vehicle chassis substantially equal to 280V (560V divided by 2). In this example, the electric potential at front end 39a of sub-stack 40 may be 280V above the vehicle chassis and the electric potential at back end 66b of sub-stack 41 may be 280V below the vehicle chassis. If back end 66b of sub-stack 41 is connected to the vehicle chassis instead of the points at which sub-stacks 40, 41 are connected to each other being connected to the vehicle chassis, the greatest difference in potential between a point on fuel-cell stack 11 and the vehicle chassis may be 560V. In this example, the electric potential at front end 39a of sub-stack 40 may be 560V above the vehicle chassis. Having some or all locations on fuel-cell stack 11 be closer to the electric potential of the frame of the mechanism housing fuel-cell stack 11 (e.g., a vehicle chassis) may decrease the extent of damage or injury in the event of a short circuit between fuel-cell stack 11 and components held at the same potential as the frame or components at other lower electric potentials.

In some embodiments, manifolds 44a, 44b may deliver oxidant to sub-stacks 40, 41, respectively. Manifolds 54a, 54b may receive oxidant from sub-stacks 40, 41, respectively. Manifolds 32a, 32b may deliver fuel to sub-stacks 40, 41, respectively. Manifolds 42a, 42b may receive fuel from sub-stacks 40, 41, respectively. Manifolds 62a, 62b may deliver coolant to sub-stacks 40, 41, respectively. Manifolds 56a, 56b may receive coolant from sub-stacks 40, 41, respectively. In some embodiments, sub-stacks 40, 41 may each receive their own streams of oxidant, fuel, and/or coolant. In this arrangement, sub-stacks 40, 41 may be considered to be connected in parallel fluidly.

In the embodiment illustrated in FIG. 5, fuel-cell stack 11 may have two or more dimensions similar to one another. For example, width 70 and length 34 may be within one foot of each other.

Figure 7:
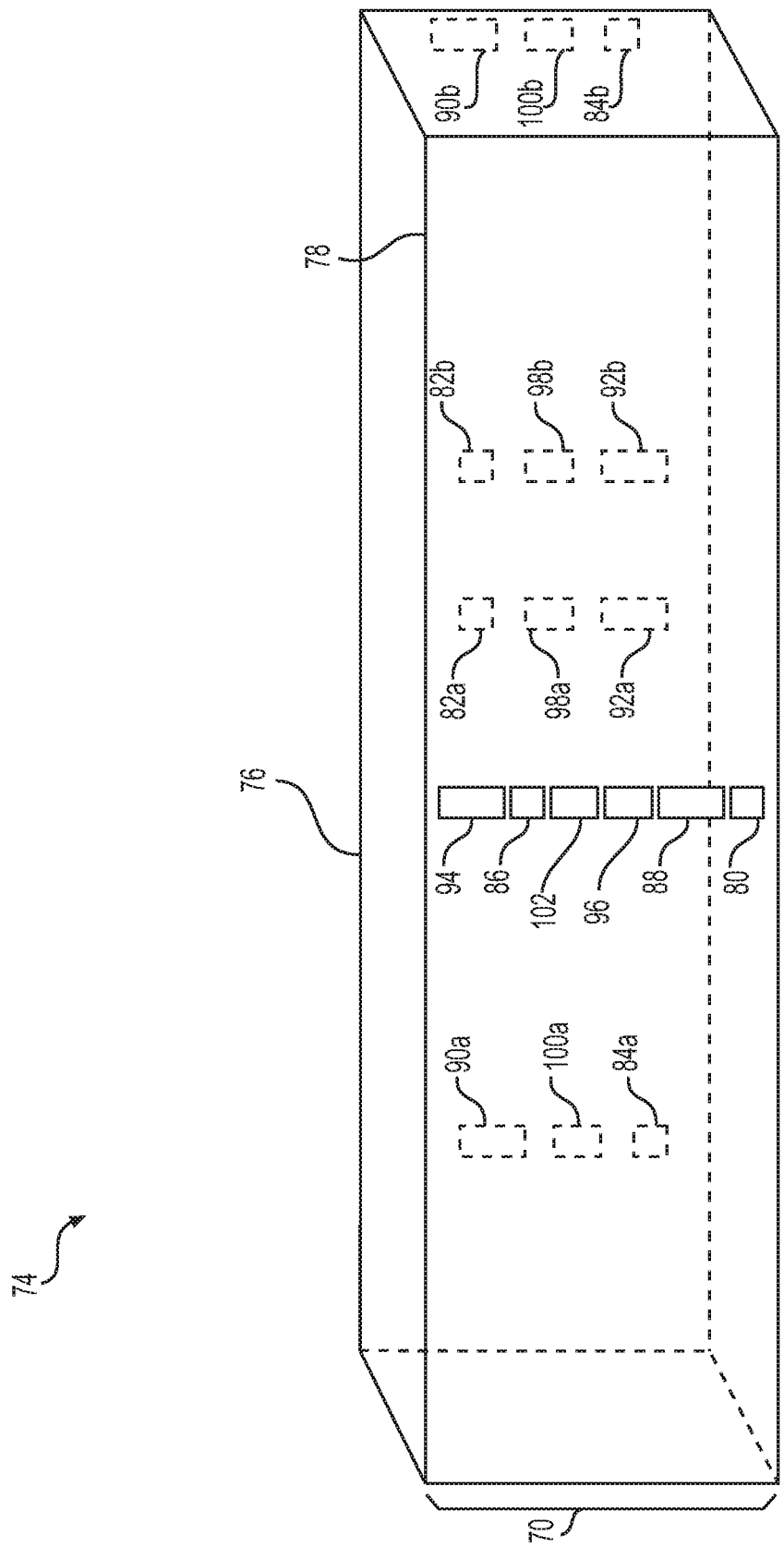
FIG. 7 is a diagram of a manifold-distribution plate, according to an exemplary embodiment.

FIG. 7 is a diagram of an exemplary embodiment of a manifold-distribution plate 74. Manifold-distribution plate 74 may distribute fuel, coolant, and oxidant to the respective feed manifolds and receive fuel, coolant, and oxidant from the respective discharge manifolds for fuel cell stack 11 of FIG. 5. Manifold-distribution plate 74 may be placed against back end 66a of sub-stack 40 and front end 39b of sub-stack 41 of fuel-cell stack 11 illustrated in FIG. 5, such that ports on plate back end 76 align with manifolds of fuel-cell stack 11. In some embodiments, manifold-distribution plate 74 may be placed against electrically conducting metal plate 104. In some embodiments, an electrically insulating material (not shown) may be interposed between manifold distribution plate 74 and sub-stacks 40,41 and/or between manifold distribution plate 74 and the electrically conducting metal plate 104. Ports on plate front end 78 are illustrated with solid lines and ports on plate back end 76 are illustrated with dashed lines. Manifold-distribution plate 74 may permit a single fluid-source connection (e.g., fuel-source connection) to supply fluid to multiple manifolds. Manifold-distribution plate 74 may have a single port for receiving a fluid on plate front end 78 and two ports on plate back end 76 for releasing the fluid, wherein the single port for receiving the fluid is fluidly coupled to the two ports for releasing the fluid. For example, anode-receiving port 80, located on plate front end 78, may receive a fuel and direct it to anode-releasing ports 84a, 84b, located on plate back end 76. The fuel may be directed into manifolds 32a, 32b of fuel-cell stack 11 from anode-releasing ports 84a, 84b. Cathode-receiving port 88, located on plate front end 78, may receive an oxidant and direct it to cathode-releasing ports 92a, 92b, located on plate back end 76. The oxidant may be directed into manifolds 44a, 44b of fuel-cell stack 11 from cathode-releasing ports 92a, 92b. Coolant-receiving port 96, located on plate front end 78, may receive a coolant and direct it to coolant-releasing ports 98a, 98b, located on plate back end 76. The coolant may be directed into manifolds 62a, 62b of fuel-cell stack 11 from coolant-releasing ports 98a, 98b. Manifold-distribution plate 74 may have two ports for receiving a fluid on plate back end 76 and one port on plate front end 78 for releasing the fluid, wherein the two ports for receiving the fluid are fluidly coupled to the single port for releasing the fluid. For example, anode-receiving ports 82a, 82b, located on plate back end 76, may receive a fuel from manifolds 42a, 42b of fuel-cell stack 11 and direct it to anode-releasing port 86, located on plate front end 78. The fuel may be released into an external system configured to receive fuel discharged from fuel-cell stack 11. Cathode-receiving ports 90a, 90b, located on plate back end 76, may receive an oxidant from manifolds 54a, 54b and direct it to cathode-releasing port 94, located on plate front end 78. The oxidant may be released into an external system configured to receive oxidant discharge from fuel-cell stack 11. Coolant-receiving ports 100a, 100b, located on plate back end 76, may receive a coolant from manifolds 56a, 56b and direct it to coolant releasing port 102, located on plate front end 78. The coolant may be released into an external system configured to receive coolant discharge from fuel-cell stack 11.

While the foregoing describes manifold-distribution plate 74 as having multiple sets of a single port on plate front end 78 coupled to two ports on plate back end 76, it is to be understood that other arrangements may be envisioned. For example, there may be more ports on plate front end 78 coupled to fewer ports on plate back end 76. Different fluids may be distributed among different arrangements of ports in manifold-distribution plate 74.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The term "about" or "approximately" as used herein means within an acceptable error range for the particular value as determined by one of ordinary skill in the art, which will depend in part on how the value is measured or determined, e.g., the limitations of the measurements system. For example, "about" can mean within one or more than one standard deviation per the practice in the art. Alternatively, "about" can mean a range of up to 20%, such as up to 10%, up to 5%, and up to 1% of a given value.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. An electrochemical cell stack assembly, comprising:
   a plurality of electrochemical cell sub-stacks, wherein:
   a first electrochemical cell sub-stack and a second electrochemical cell sub-stack are connected electrically in series and connected fluidly in parallel;
   the first electrochemical cell sub-stack and the second electrochemical cell sub-stack comprise a plurality of electrochemical cells comprising:
   a membrane electrode assembly comprising a cathode catalyst layer, an anode catalyst layer, and a polymer membrane interposed between the cathode catalyst layer and the anode catalyst layer,
   an anode plate and a cathode plate with the membrane electrode assembly interposed therebetween, and
   a cathode flow field positioned between the cathode plate and the cathode catalyst layer; and
   the electrochemical cell stack assembly further comprises a manifold distribution plate connected to a first end of the first electrochemical cell sub-stack and a first end of the second electrochemical cell sub-stack, wherein the manifold distribution plate is configured to fluidly split a supply of at least one of fuel, oxidant, or coolant to the first and second electrochemical cell sub-stacks.

2. The electrochemical cell stack assembly of claim 1, wherein electrical current passes from the first electrochemical cell sub-stack to the second electrochemical cell sub-stack.

3. The electrochemical cell stack assembly of claim 1, further comprising:
   a first electrically conductive structure disposed at a first end of the first electrochemical cell sub-stack; and
   a second electrically conductive structure disposed at a first end of the second electrochemical cell sub-stack, wherein the first electrically conductive structure is electrically coupled to the second electrically conductive structure.

4. The electrochemical cell stack assembly of claim 1, further comprising an electrically conductive structure disposed at the first ends of the first and second electrochemical cell sub-stacks.

5. The electrochemical cell stack assembly of claim 1, further comprising an electrically conductive structure disposed at a first end of at least one of first or second electrochemical cell sub-stacks, wherein the electrically conductive structure is electrically coupled to a frame of a mechanism housing the electrochemical cell stack assembly.

6. The electrochemical cell stack assembly of claim 5, wherein the electrically conductive structure is at a common electric potential with the frame of the mechanism housing the electrochemical cell stack assembly.

7. The electrochemical cell stack assembly of claim 1, further comprising:
a first current collector disposed at a first end of the first electrochemical cell sub-stack and
a second current collector disposed at a first end of the second electrochemical cell sub-stack.

8. The electrochemical cell stack assembly of claim 7, wherein the first current collector is at a higher electric potential than a frame of a mechanism housing the electrochemical cell stack assembly and wherein the second current collector is at a lower electric potential than the frame of the mechanism housing the electrochemical cell stack assembly.

9. The electrochemical cell stack assembly of claim 7, wherein the first current collector is at an electric potential from about −1000 volts to about +1000 volts and the second collector is at an electric potential from about −1000 volts to about +1000 volts.

10. The electrochemical cell stack assembly of claim 7, wherein electrons flow (i) in a first direction from the first current collector to a second end of the first electrochemical cell sub-stack and (ii) in a second direction from a second end of the second electrochemical cell sub-stack to the second current collector, wherein the first direction is opposite the second direction.

11. The electrochemical cell stack assembly of claim 1, wherein an electrical insulator is disposed between the first and second electrochemical cell sub-stacks.

12. The electrochemical cell stack assembly of claim 1, wherein a supply of at least one of fuel, oxidant, or coolant is split between the first and second electrochemical cell sub-stacks fluidly connected in parallel.

13. The electrochemical cell stack assembly of claim 1, wherein the cathode flow field comprises a porous structure and the plurality of electrochemical cell sub-stacks generate a current from about 0 amperes to about 1000 amperes.

14. A method of arranging an electrochemical cell stack assembly, comprising:
connecting electrically a first electrochemical cell sub-stack and a second electrochemical cell sub-stack in series;
connecting fluidly the first electrochemical cell sub-stack and the second electrochemical cell sub-stack in parallel,
wherein the first electrochemical cell sub-stack and the second electrochemical cell sub-stack comprise a plurality of electrochemical cells comprising:
a membrane electrode assembly comprising a cathode catalyst layer, an anode catalyst layer, and a polymer membrane interposed between the cathode catalyst layer and the anode catalyst layer,
an anode plate and a cathode plate with the membrane electrode assembly interposed therebetween, and
a cathode flow field and anode flow field;
connecting a manifold distribution plate to a first end of the first electrochemical cell sub-stack and a first end of the second electrochemical cell sub-stack, the manifold distribution plate being configured to fluidly split a supply of at least one of fuel, oxidant, or coolant to the first and second electrochemical cell sub-stacks.

15. The method of claim 14, further comprising:
disposing an electrical insulator between the first and second electrochemical cell sub-stacks;
disposing a first electrically conductive structure at the first end of the first electrochemical cell sub-stack;
disposing a second electrically conductive structure at the first end of the second electrochemical cell sub-stack; and
electrically coupling the first electrically conductive structure to the second electrically conductive structure.

16. The method of claim 14, further comprising disposing an electrically conductive structure at the first ends of the first and second electrochemical cell sub-stacks.

17. The method of claim 14, further comprising disposing an electrically conductive structure at a first end of at least one of first or second electrochemical cell sub-stacks, wherein the electrically conductive structure is electrically coupled to a frame of a mechanism housing the electrochemical cell stack assembly.

18. The method of claim 17, wherein the electrically conductive structure is at a common electric potential with the frame of the mechanism housing the electrochemical cell stack assembly.

19. The method of claim 14, further comprising:
disposing a first current collector at a first end of the first electrochemical cell sub-stack, and
disposing a second current collector at a first end of the second electrochemical cell sub-stack,
wherein the first current collector is at a higher electric potential than a frame of a mechanism housing the electrochemical cell stack assembly and wherein the second current collector is at a lower electric potential than the frame of the mechanism housing the electrochemical cell stack assembly.

20. The electrochemical cell stack assembly of claim 4, wherein the manifold-distribution plate is placed against the electrically conductive structure.

21. The electrochemical cell stack assembly of claim 20, wherein an electrically insulating material is interposed between the manifold distribution plate and the first ends of the first and second electrochemical cell sub-stacks.

22. The electrochemical cell stack assembly of claim 21, wherein the electrically insulating material is interposed between the manifold distribution plate and the electrically conductive structure.

* * * * *